United States Patent [19]
Towle

[11] Patent Number: 6,020,085
[45] Date of Patent: Feb. 1, 2000

[54] BATTERY PACK CONSTRUCTION AND METHOD OF USING SAME

[75] Inventor: Lawrence E. Towle, San Diego, Calif.

[73] Assignee: HM Electronics, Inc., San Diego, Calif.

[21] Appl. No.: 08/955,934

[22] Filed: Oct. 22, 1997

[51] Int. Cl.[7] .......................... H01M 10/16; H01M 2/02; H01M 2/00
[52] U.S. Cl. ................. 429/96; 429/96; 429/97; 429/98; 429/99
[58] Field of Search ................. 429/97, 98, 99, 429/96

[56] References Cited

U.S. PATENT DOCUMENTS

| | | |
|---|---|---|
| 3,572,889 | 3/1971 | Bloomfield ................. 350/87 |
| 4,554,221 | 11/1985 | Schmid ........................ 429/1 |
| 5,019,465 | 5/1991 | Herron et al. ............. 429/97 |
| 5,224,870 | 7/1993 | Weaver et al. ............ 439/197 |
| 5,326,651 | 7/1994 | Mehta et al. .............. 429/96 |
| 5,697,070 | 12/1997 | Liebler ...................... 455/90 |
| 5,765,658 | 6/1998 | Mayer ....................... 180/206 |

*Primary Examiner*—Maria Nuzzolillo
*Assistant Examiner*—Mark Ruthkosky
*Attorney, Agent, or Firm*—Higgs Fletcher & Mack LLP; Bernard L. Kleinke

[57] ABSTRACT

The battery pack construction includes a housing having a battery cell disposed therein. The housing includes a base member, battery contacts recessed from the base member, and a locating recess in the base member. The housing further includes an alignment arrangement at one end thereof and a latching assembly at another end thereof.

9 Claims, 2 Drawing Sheets

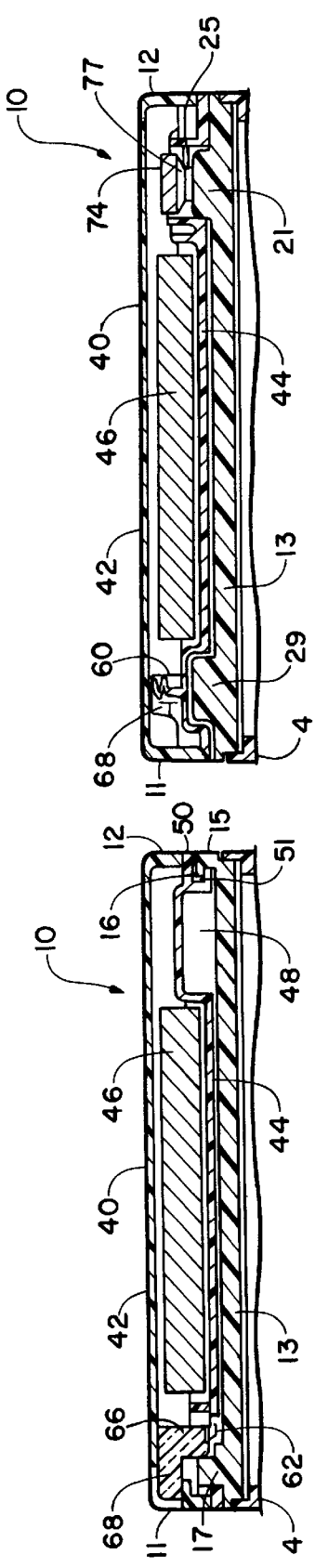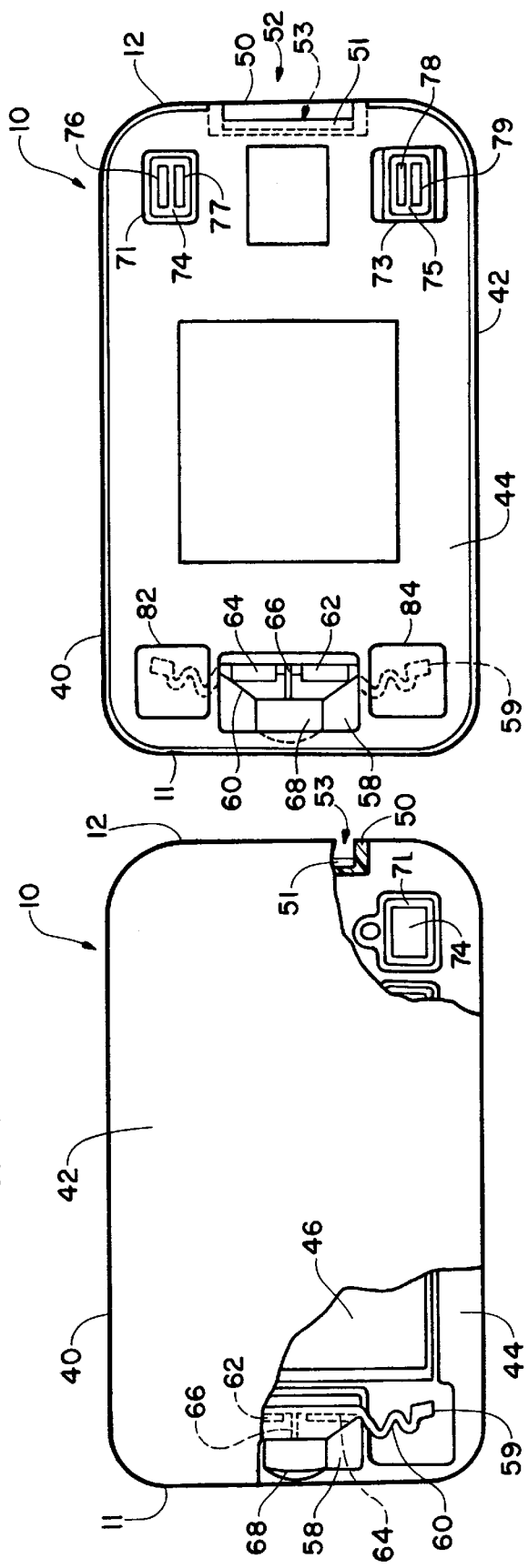

BATTERY PACK CONSTRUCTION AND METHOD OF USING SAME

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Technical Field

The present invention relates in general to a battery pack construction, and a method of using it. The invention more particularly relates to a battery pack construction for use in a harsh environment with an electrical device, and which can be securely attached to the electrical device quickly and conveniently according to the method of the present invention.

2. Background Art

The use of electrical devices, such as communication devices, in the fast food industry has enabled restaurant employees to serve customers in an efficient manner. Such devices have been powered by either rechargeable or non-rechargeable battery cells coupled directly to the devices to increase the mobility of the employee using the device. The rechargeable battery cells have been especially desirable as they can be used over extended periods of time with recharging, and can be coupled to the electrical devices relatively easily The rechargeable battery cells have been contained in battery packs which were capable of being coupled removeably to the device. In this way, a battery pack with a depleted battery cell was detached from the device and replaced with a battery pack having recharged battery cell. By maintaining at least one battery pack with a recharged battery cell in reserve, the electrical device was capable of substantially continuous operation for prolonged periods of time by exchanging battery packs when necessary.

While the removable battery packs enabled the devices to be operated for extended periods of time, the harsh environment of fast food restaurants substantially reduced the operational life of the battery packs. Restaurant employees, typically young adults, subjected the devices and the attached battery packs to constant physical abuse while attempting to complete customer orders in the shortest amount of time possible. The battery pack was especially susceptible to damage upon accidental detachment from the device. Once detached, the battery pack was vulnerable to being damaged, including damage caused by a hard ground surface upon impact, by a crushing blow imparted by an employee accidentally stepping on the detached battery pack, or by the detached battery pack falling onto a hot cooking surface.

Furthermore, the battery pack was susceptible to being inadvertently discharged when detached from the device. In this regard, battery contacts on the battery pack were capable of contacting an electrically conductive surface, such as a metal counter in a restaurant, when the battery pack was detached from the device.

Therefore, it would be highly desirable to have a new and improved battery pack construction which can be securely, conveniently and removeably attached to an electrical device, and a method of using it. Such a battery pack construction should substantially prevent accidental discharge when detached from the device.

SUMMARY OF THE INVENTION

Therefore, the principal object of the present invention is to provide a new and improved battery pack construction for an electrical device and a method of using it, wherein the battery pack construction is securely and removeably attachable to the device, and is substantially resistant to being discharged when detached from the device.

Briefly, the above and further objects of the present invention are realized by providing a new and improved battery pack construction, which can be used according to a novel method of the present invention.

The battery pack construction includes a housing having a battery cell disposed therein. The housing includes a base member, battery contacts recessed from the base member, and a locating recess in the base member. The housing further includes an alignment arrangement at one end thereof and at latching assembly at another end thereof.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 3 is cross-sectional cut-away view of the battery pack construction and communication device of FIG. 1, taken substantially on line 3—3 thereof;

FIG. 4 is a cross-sectional cut-away view of the battery pack construction and communication device of FIG. 1, taken substantially on line 4—4 thereof;

FIG. 5 is a partially cut-away plan view of the top of the battery pack construction of FIG. 1; and FIG. 6 is a plan view of the bottom of the battery pack construction of FIG. 1.

BEST MODE FOR CARRYING OUT THE INVENTION

Figures 1, 2:
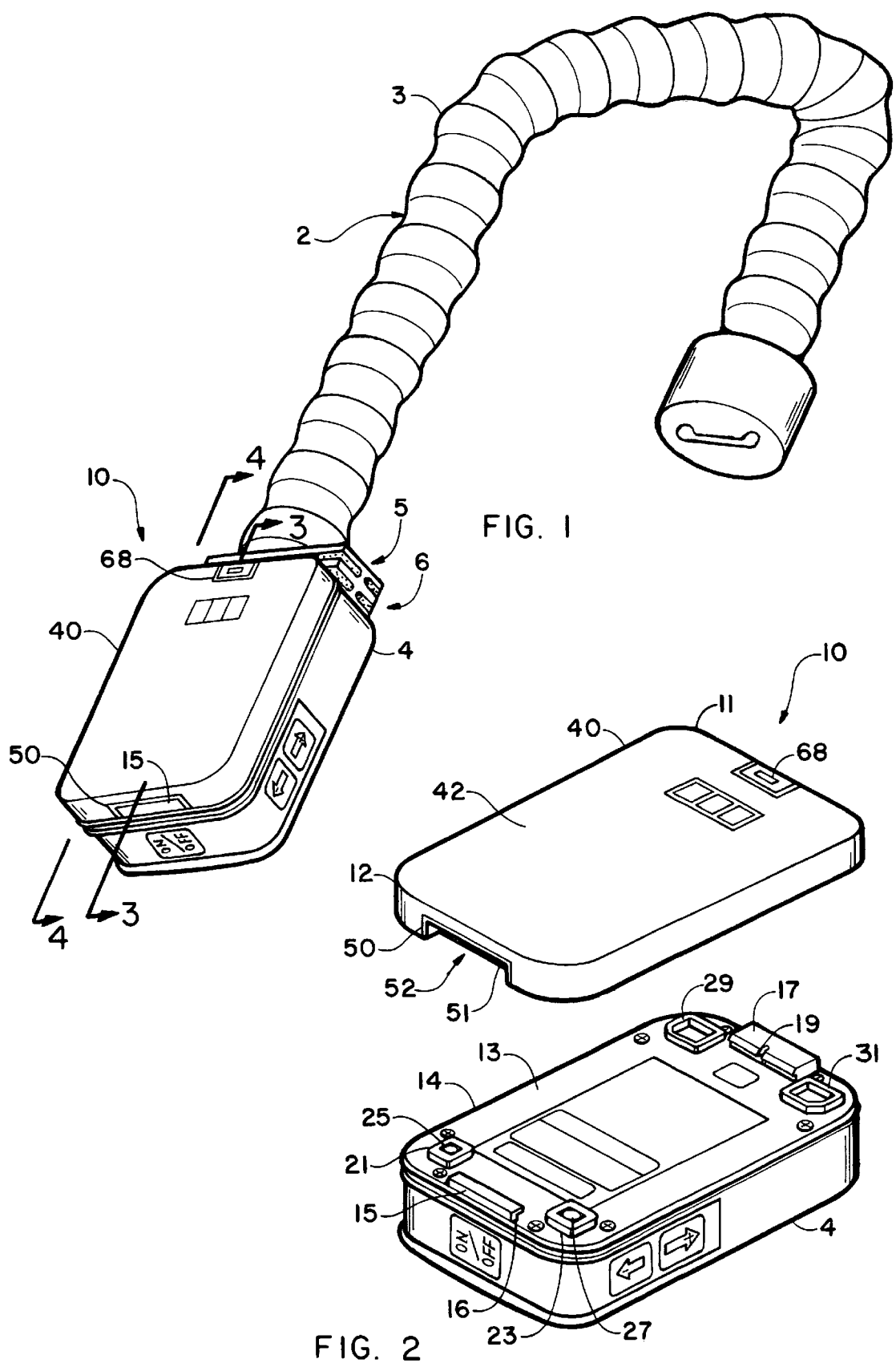
FIG. 1 is a perspective view of a battery pack construction attached to a communication device, which battery pack construction is constructed in accordance with the present invention.
FIG. 2 is a perspective view of the battery pack construction of FIG. 1 detached from the communication device illustrating a battery interface on the communication device.

Referring now to the drawings, and more particularly to FIGS. 1 and 2 thereof, there is shown a battery pack construction 10 adapted for use with an electrical device, such as a neck supported communication device 2, for supplying electrical energy thereto. The device 2 includes a neck engaging support 3 for supporting the device 2 from the neck of a user (not shown) a device housing 4, a microphone assembly 5 and a speaker assembly 6 for facilitating communication between the device 2 and a remote communication station (not shown).

An exemplary communication device is described in co-owned and co-pending U.S. patent application Ser. No.

08/567,154, filed Dec. 5, 1995. The battery pack construction 10 can be quickly, conveniently and securely attached to the device 2 in accordance with the method of the present invention.

The battery pack construction 10 includes a substantially rectangular housing 40 having opposite ends 11 and 12, a cover 42 and a substantially rectangular base 44 (FIG. 6). The base 44 is partially received within the cover 42 and supported at a perimeter thereof. The base 44 extends slightly beyond the cover 42 to define a shoulder around the bottom perimeter of the housing 40. A rechargeable battery cell 46 (FIGS. 3–5) is disposed in the housing 40 to store and supply electrical energy. The battery cell 46 can be selected from any suitable rechargeable battery cell types, including nickel cadmium, nickel metal hydride, and lithium ion, for example.

The battery pack construction 10 attaches to the device 2 at the device housing 4. The housing 4 includes a substantially rectangular battery interface 13 and a small upstanding wall 14 along the perimeter of the interface 13. The base 44 engages the interface 13 when the battery pack construction 10 is attached to the device housing 4, wherein the base 44 is received within the wall 14.

A wall assembly 50 disposed at end 12 defines a slotted opening 52 to facilitate an initial alignment of the battery pack construction 10 with the interface 13. In this regard, the wall assembly 50 cooperates with an upwardly extending inverted L-shaped retaining hook member 15 (FIG. 2) on the interface 13 to position or align the housing 40 relative to the interface 13.

The wall assembly 50 includes a recessed ledge 51 (FIGS. 2 and 3) for defining an undercut opening 53 (FIGS. 5 and 6) within the slotted opening 52. A leg or flange 16 (FIGS. 2 and 3) extends inwardly from the top of the hook member 15 and is adapted to be received within the undercut opening 53. As best seen in FIGS. 1 and 3, the retaining hook member 15 is received within the slotted opening 52, wherein leg 16 is disposed snugly within the undercut opening 53, to couple the battery pack construction 10 to the device housing 4 at end 12. In this way, the end 12 is substantially prevented from being displaced upwardly away from the device housing 4 and is also substantially prevented from moving slidably rearwardly relative to the interface 13 as the housing 40 is positioned on the interface 13. As described in greater detail below, the hook member 15 facilitates aligning the housing 40 on the housing 4, and further aids in pivoting the housing 40 onto the interface 13.

A latching arrangement 59 (FIGS. 5 and 6) is disposed at the end 11 to selectively secure the housing 40 to the device housing 4 at the end 11. When engaged with the device housing 4, the latching arrangement 59 substantially prevents the end 11 from being displaced from the interface 13. The latching arrangement 59 includes a hinge 60 disposed within the housing 40 adjacent to an opening 58 in the base 44. The hinge 60 is connected integrally at its ends to the base 44 to define a living hinge. Centrally located on the hinge 60 is a pair of spaced apart downwardly depending catch members 62 and 64, a centering blade 66 and a release button 68. The catch members 62 and 64 cooperate with an inverted L-shaped latch member 17 (FIG. 2) extending upwardly from the interface 13 to secure the end 11 of the housing 40 to the device housing 4.

As shown in FIG. 3, the latch member 17 extends through the opening 58 to engage cammingly the catch members 62 and 64. The centering blade 66 is received within a notch 19 in the latch member 17 as the latch member 17 extends through the opening 58 to engage the catch members 62 and 64. As the latch member 17 engages the catch members 62 and 64, the catch members 62 and 64, and the hinge 60, are urged inwardly cammingly until the catch members 62 and 64 eventually overlap the latching member 17 to secure the battery pack construction 10 to the device housing 4 at the end 11.

The release button 68 extends out of an opening (not shown) in the housing 40 to enable the battery pack construction 10 to be removed from the device housing 4 when desired. To disengage the catch members 62 and 64 from the latch member 17, the release button 68 is pressed inwardly. The end 11 can then be displaced away from the interface 13.

The battery pack construction 10 further includes a locating arrangement to position the housing 40 in proper alignment with the interface 13, and to limit sliding movement of the housing 40 relative to the interface 13. The locating arrangement includes projections or posts 21, 23, 29 and 31 at about the four corners of the interface 13. A pair of spaced apart locating recesses 82 and 84 (FIG. 6) formed in the base 44 at about end 11 cooperate with the locating projections 29 and 31 to facilitate locating the battery pack construction 10 on the interface 13.

The locating projections 29 and 31 are adapted to correspond substantially to the openings defined by locating recesses 82 and 84, wherein the locating projections 29 and 31 are received snugly within the locating recesses 82 and 84 (FIG. 4) in a snap or friction fit. As a result, the locating projections 29 and 31 cooperate with the locating recesses 82 and 84 to substantially limit sliding movement of the housing 40 relative to the interface 13.

Another pair of spaced apart locating recesses 71 and 73 (FIG. 6) formed in the base 44 at about end 12 cooperate with posts 21 and 23 to further help position the construction 10 on the interface 13. The recesses 71 and 73 are slightly oversized to permit the posts 21 and 23 to be received therein as the housing 40 is pivoted about the hook member 15 when attaching the construction 10. In the preferred embodiment, the posts 21 and 23 define terminal posts to facilitate an electrical connection between the battery cell 46 and the device 2.

Contact support pads 74 and 75 are disposed within the recesses 71 and 73, preferably terminal recesses, to help support battery contacts 76–79. The battery contacts 76–79 are curved outwardly from the pads 74 and 75, and are supported from the pads 74 and 75 in a spring-loaded manner. The battery contacts 76–79 are connected to the battery cell 46 by circuitry (not shown) and cooperate with contacts 25 and 27 atop terminal posts 21 and 23 to connect electrically the battery cell 46 to the device 2.

The recessed battery contacts 76–79 engage the contacts 25 and 27 as the terminal posts 21 and 23 are received within the terminal recesses 71 and 73 (FIG. 4). The terminal posts 21 and 23 are adapted to urge the battery contacts 76–79 inwardly, wherein the battery contacts 76–79 resist the inward extension of the terminal posts 21 and 23 to maintain an electrical contact between the battery contacts 76–79 and the fixed contacts 25 and 27. Alternatively, the spring-loaded contacts could be positioned on the terminal posts 21 and 23 and the fixed contacts positioned within the terminal recesses 71 and 73.

In operation, the battery pack construction 10 is attached to the device 2 by initially positioning the housing 40 relative to the interface 13 to enable the hook member 15 to be received within the slotted opening 52. The leg 16 is urged into the undercut opening 53, to substantially align the housing 40 relative to the interface 13 and to substantially prevent the end 12 from being displaced from the interface 13.

With the leg 16 disposed within the undercut opening 53, the housing 40 is pivoted about the hook member 15 at the end 12 toward the interface 13. As the end 11 of the housing 40 is urged toward the interface 13, the latch member 17 is received through the opening 58 to engage the catch members 62 and 64. Continuing to urge the housing 40 towards the interface 13 causes the catches 62 and 64 to cam inwardly until the catches 62 and 64 overlap the latch member 17 to secure the end 11 of the housing 40 to the interface 13.

As the housing 40 is pivoted toward the interface 13, the locating projections or posts 21, 23, 29 and 31 are received within the recesses 71, 73, 82 and 84 to position the housing 40 on the interface 13 and to prevent sliding movement of the base 44 relative to the interface 13. The posts 21 and 23 are initially received in the oversized recesses 71 and 73 to further position the housing 40 on the interface 13. Although the posts 21 and 23 and the recesses 71 and 73 are coupled loosely to facilitate the pivoting of the housing 40 onto the interface 13, the posts 21 and 23 and recesses 71 and 73 limit sliding movement of the housing 40 relative to the interface 13 when engaged thereon As the posts 21 and 23 are received in the terminal recesses 71 and 73, the contact 25 engages the recessed spring-loaded battery contacts 76 and 77 and the contact 27 engages the recessed spring-loaded battery contacts 78 and 79 to connect electrically the battery cell 46 to the device 2.

Similarly, the posts or projections 29 and 31 are received within the recesses 82 and 84 as the catches 62 and 64 engage the latch member 17. As the catches 62 and 64 overlap the latch member 17, the posts 29 and 31 are urged into a snap or friction fit to further secure the construction 10 on the housing 4.

The removal of the battery pack construction 10 from the device 2 is effected by pressing the release button 68 inwardly to disengage the catches 62 and 64 from the latch member 17. The housing 40 is then pivoted outwardly about the hook member 15 at the end 12, and end 12 is disengaged from the hook member 15 to free the housing 40 from the interface 13.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A battery pack construction for use with an electrical device having a hook member and locating posts, comprising:

a housing having opposite ends and a base member;

a battery cell disposed within said housing;

means defining an opening for receiving the hook member, and having a recessed ledge for cooperating with the hook member, said opening being disposed at one of said ends for aligning said housing on the device, and dimensioned for permitting the housing to pivot about said hook member into engagement with the electrical device and for substantially preventing said one end from being displaced away from the device;

a locating assembly including at least one recess at said one end and at least one other recess at another one of said ends for locating said housing on the device and for substantially limiting sliding movement of said base member relative to the device, said recesses receiving individual ones of said locating posts on the electrical device,;

latch means disposed at said another end for selectively preventing said another end from being displaced away from the device; and terminal means for facilitating an electrical connection between said battery cell and the device, said terminal means including battery contacts in said recesses.

2. A battery pack construction according to claim 1, wherein said battery contacts are spring loaded contacts.

3. A battery pack construction according to claim 1, wherein said at least one recess is oversized and adapted to receive loosely one of the locating posts therein, the recess being slightly larger than the post to be received therein for enabling the battery construction to pivot onto the electrical device and limit sliding thereon.

4. A battery pack construction according to claim 1, wherein said another pair of spaced apart recesses are adapted to receive snugly a pair of posts therein.

5. A method of engaging a battery pack construction with an electrical device, comprising:

using a housing having opposite ends, a base member, and a battery cell disposed within said housing;

engaging an opening having a recessed ledge at one end of said housing with a hook member on the device to substantially prevent said one end from being displaced away from the device;

pivoting said housing about said hook member at said one end toward said device;

receiving, responsive to the pivoting of said housing, an upstanding post within a recess in said base member to locate said housing on the device and to substantially limit sliding movement of said base member relative to the device at said one end;

receiving, responsive to further pivoting of said housing, another upstanding post within another recess in said base member to locate said housing on the device and to substantially limit sliding movement of said base member relative to the device at the another one of said ends; and latching the battery construction to the electrical device at the another one of said ends for selectively preventing the another one of said ends from being displaced away from the device.

6. A method according to claim 5, further including receiving loosely a first pair of said posts within a first pair of spaced apart oversized recesses at about said end, each of said spaced apart recesses being slightly larger than the post to be received therein.

7. A method according to claim 5, further including receiving snugly a second pair of said posts within a second pair of spaced apart recesses at about said another end.

8. A communication device, comprising:

a communication housing having a battery pack interface surface;

a battery pack construction including a battery pack housing having oppositely disposed ends and a base member, and a battery cell disposed within the battery pack housing;

terminal means for facilitating an electrical connection between said battery cell and said communication housing said terminal means including battery contacts recessed in said base member;

means for aligning said battery pack housing on said battery pack interface and for preventing one of said ends from being displaced away from said battery pack interface, said means for aligning positioned at one of said ends and configured to enable another of said ends of the battery pack housing to pivot toward the battery pack interface;

means for locating said one end of said battery pack housing on said battery pack interface and for substantially limiting sliding movement of said base member relative to said battery pack interface at the one end, said means for locating being at least one recess for receiving a post;

means for locating said another one of said ends of said battery pack housing on said battery pack interface and for substantially limiting sliding movement of said base member relative to said battery pack interface at the another one of said ends, said means for locating being at least one recess for receiving a post; and latch means disposed at the another one of said ends for selectively preventing said another end from being displaced away from said battery pack interface.

9. A battery pack construction for use with an electrical device including a generally rectangular device housing having opposite ends, a pair of spaced apart upstanding posts at one of said ends, a hook member disposed between said pair of posts, another pair of spaced apart upstanding posts at another one of said ends, and a latch member disposed between said another pair of posts, comprising:

a generally rectangular battery housing having a slotted opening at one end thereof to receive the hook member therein for pivoting said battery housing relative to the device housing;

a pair of recesses in said battery housing for receiving loosely said pair of posts as said battery housing is pivoted, each recess of the pair of said spaced apart recesses being slightly larger than the post to be received therein;

another pair of recesses in said battery housing for receiving snugly said another pair of posts in a friction fit; and latch means disposed at another end of said battery housing for selectively securing said another battery housing end to the latch member.

* * * * *